US009535595B2

(12) United States Patent
Kodama et al.

(10) Patent No.: US 9,535,595 B2
(45) Date of Patent: Jan. 3, 2017

(54) ACCESSED LOCATION OF USER INTERFACE

(75) Inventors: Justin Kodama, Emeryville, CA (US); Matthew Hornyak, San Francisco, CA (US); Matthew Znameroski, Menlo Park, CA (US); Bradford Vogel, San Francisco, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 913 days.

(21) Appl. No.: 13/284,370

(22) Filed: Oct. 28, 2011

(65) Prior Publication Data

US 2013/0111360 A1 May 2, 2013

(51) Int. Cl.
*G06F 3/00* (2006.01)
*G06F 3/0488* (2013.01)
*G06F 21/56* (2013.01)
*G06F 21/60* (2013.01)
*G06F 9/44* (2006.01)
*G06F 3/14* (2006.01)

(52) U.S. Cl.
CPC ............ *G06F 3/0488* (2013.01); *G06F 21/56* (2013.01); *G06F 21/606* (2013.01); *G06F 3/1454* (2013.01); *G06F 9/4445* (2013.01)

(58) Field of Classification Search
CPC .................... G06F 3/1454; G06F 9/4445
USPC ........................................................ 715/753
See application file for complete search history.

(56) References Cited

U.S. PATENT DOCUMENTS

| 5,008,853 | A | * | 4/1991 | Bly | G06F 17/30171 |
| | | | | | 345/2.1 |
| 5,107,443 | A | * | 4/1992 | Smith et al. | 715/751 |
| 5,872,922 | A | * | 2/1999 | Hogan | H04N 7/142 |
| | | | | | 348/14.03 |
| 6,237,025 | B1 | * | 5/2001 | Ludwig et al. | 715/756 |
| 7,461,121 | B2 | * | 12/2008 | Doi et al. | 715/753 |
| 7,849,410 | B2 | * | 12/2010 | Chang | 715/754 |
| 7,870,496 | B1 | * | 1/2011 | Sherwani | 715/761 |
| 8,010,901 | B1 | * | 8/2011 | Rogers | 715/751 |
| 8,843,830 | B2 | * | 9/2014 | Eom | 715/740 |
| 2004/0250214 | A1 | * | 12/2004 | McGlinchey | G06F 9/4446 |
| | | | | | 715/762 |
| 2005/0273700 | A1 | * | 12/2005 | Champion | G06F 3/04883 |
| | | | | | 715/233 |
| 2006/0010392 | A1 | * | 1/2006 | Noel | G06F 3/0481 |
| | | | | | 715/759 |
| 2006/0168533 | A1 | * | 7/2006 | Yip | G06Q 10/10 |
| | | | | | 715/753 |

(Continued)

OTHER PUBLICATIONS

Jiazhi Ou et al., Gestural Commnnication over Video Stream: Supporting Multimodal Interaction for Remote Collaborative Physical Tasks, School of Computer Science Carnegie Mellon University, Nov. 5, 2003, http://sfussell.hci.cornell.edu/pubs/Manuscripts/p107-ou.pdf.

*Primary Examiner* — Dino Kujundzic
(74) *Attorney, Agent, or Firm* — Kilpatrick Townsend & Stockton LLP (57) ABSTRACT

A device to render a user interface, detect a user accessing a location of the a user interface, share a portion of the user interface for a second device to render a second user interface, and transmit information of the accessed location for the second device to render a visual indicator at a location of the second user interface based on the information of the accessed location.

19 Claims, 6 Drawing Sheets

(56) References Cited

U.S. PATENT DOCUMENTS

| | | |
|---|---|---|
| 2008/0301101 A1* | 12/2008 | Baratto et al. ............... 715/704 |
| 2009/0125586 A1* | 5/2009 | Sato ..................... G06F 3/1454 709/203 |
| 2009/0167700 A1 | 7/2009 | Westerman et al. |
| 2009/0235170 A1* | 9/2009 | Golden .................... G06F 3/14 715/719 |
| 2010/0131868 A1* | 5/2010 | Chawla .................. G06F 3/044 715/759 |
| 2011/0085016 A1 | 4/2011 | Kristiansen et al. |
| 2011/0181492 A1* | 7/2011 | Soeda ..................... G09G 5/14 345/1.1 |
| 2011/0191695 A1* | 8/2011 | Dinka .................. G06F 3/0481 715/753 |
| 2011/0202854 A1* | 8/2011 | Chan et al. .................. 715/762 |
| 2012/0110474 A1* | 5/2012 | Chen et al. .................. 715/753 |

\* cited by examiner

ACCESSED LOCATION OF USER INTERFACE

BACKGROUND

If one or more users are at different locations and would like to view the same visual content, a user can establish a remote connection with the other users. The other users can then view the visual content and can gain access to the user's device. This can create security concerns for the user as the content and data of the user's device becomes visible and accessible to the other users. Additionally, the user's device can be exposed and harmed by malware which may be present on the other user's devices.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A device can include a display component to display a user interface with visual content for a user of the device to view and interact with. The visual content can include alphanumeric characters, images, and/or videos included on objects displayed as part of the user interface. An object can be wallpaper, a screensaver, media, a document, and/or an application of the device. As the user interface is displayed, a sensor of the device can detect for a user accessing a location of the user interface. A user can access a location of the user interface with a hand gesture for the device to detect information of the accessed location.

Further, the device can share a portion of the user interface with a second device. The second device can then render a second user interface corresponding to a portion of the user interface. In one embodiment, the portion includes the entire user interface. In another embodiment, the portion includes one or more of the objects included on the user interface. As a result, a user of the second device can view all or some of the user interface of the device.

As a portion of the user interface is shared, the device can transmit information of the accessed location to the second device. In response, the second device can render a visual indicator at a location of the second user interface corresponding to the accessed location of the user interface. The visual indicator can be a visual mark and/or a modification to the second user interface, such as a magnification or an animation. By rendering the visual indicator at a location of the second user interface corresponding to the accessed location of the user interface, a user of the second device can view and identify an area of interest of the user interface accessed by the user.

Figure 1:
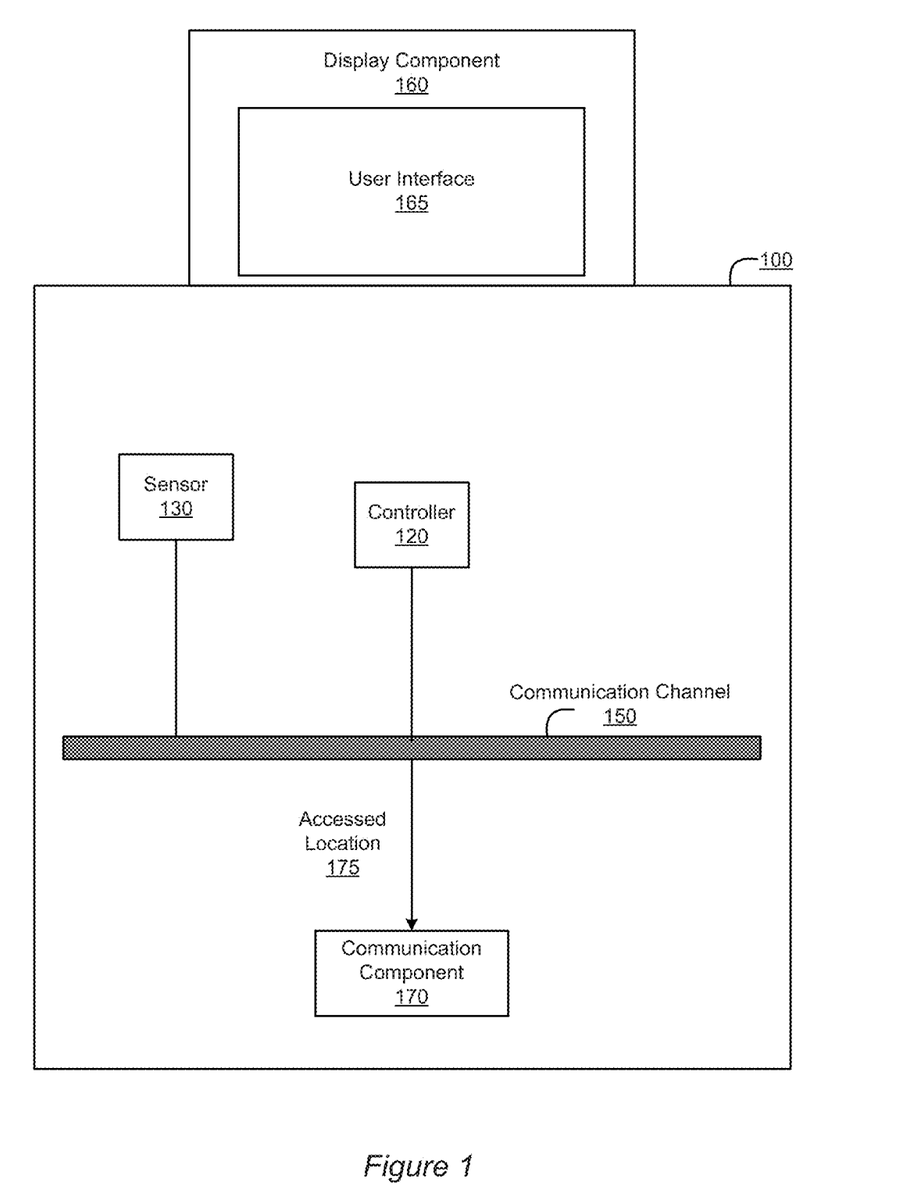
FIG. 1 illustrates a device coupled to a display component according to an example.

FIG. 1 illustrates a device 100 coupled to a display component 160 according to an example. The device 100 can be a laptop, a notebook, a tablet, a netbook, an all-in-one system, and/or a desktop. In another embodiment, the device 100 can be a cellular device, a PDA (Personal Digital Assistant), an E (Electronic)-Reader, and/or any additional device which can be coupled to a display component 160. The device 100 includes a controller 120, a display component 160, a sensor 130, a communication component 170, and a communication channel 150 for components of the device 100 to communicate with one another. In other embodiments, the device 100 includes an interface application which can be utilized independently and/or in conjunction with the controller 120 to manage the device 100. The interface application can be a firmware or application which can be executed by the controller 120 from a non-transitory computer readable memory of the device 100.

When managing the device 100, the controller 120 and/or the interface application can render a user interface 165 on the display component 160. For the purposes of this application, the user interface 165 displays visual content included on objects rendered as part of the user interface 165. The objects can be media, a document, wallpaper, a screensaver, a webpage, and/or an application of the device 100. The display component 160 is a hardware output component which can display the user interface 165 as a visual interface of the device 100. In one embodiment, the display component 160 is a LCD (liquid crystal display), a LED (light emitting diode) display, a CRT (cathode ray tube) display, a plasma display, a projector and/or any additional device configured to display the user interface 165.

As the user interface 165 is displayed, a sensor 130 of the device 100 can detect for a user of the device 100 accessing one or more locations of the user interface 165. For the purposes of this application, the sensor 130 is a hardware component of the device 100 which can detect for a hand gesture from the user to detect the user accessing a location of the user interface 165. The sensor 130 can include an image capture component, a touch screen, a proximity sensor, radar, and/or any additional hardware component which can detect a hand gesture from the user.

A hand gesture can include the user touching a location of the user interface 165. In another embodiment, the hand gesture can include the user hovering above or coming within proximity of a location of the user interface 165. In other embodiments, the hand gesture can include the user pointing at a location of the user interface 165. If the sensor 130 detects the user accessing the user interface 165, the sensor 130 can pass information of an accessed location 175 to the controller 120 and/or the interface application. In one embodiment, the information of the accessed location 175 can include a coordinate of the user interface 165 accessed by the user.

The controller 120 and/or the interface application can then transmit information to a second device using a communication component 170. For the purposes of this application, the communication component 170 is hardware component of the device which can receive and/or transmit data and information between the device 100 and the second device. The communication component 170 can be a network interface component, a radio component, an infrared component, a Bluetooth component, and/or any additional component which can receive and/or transmit data and/or information between the device 100 and the second device.

Similar to the device 100, the second device can be a laptop, a notebook, a tablet, a netbook, an all-in-one system, a desktop, a cellular device, a PDA (Personal Digital Assistant), an E (Electronic)-Reader, and/or any additional device which can be coupled to a display component to render a second user interface for a user of the second device.

Transmitting information to the second device includes the controller 120 and/or the interface application sharing a portion of the user interface 165 with a second device. When sharing a portion of the user interface 165, the controller 120 and/or the interface application initially determine which portion of the user interface 165 to share with the second device. In one embodiment, a portion of the user interface 165 can include the entire user interface 165. In another embodiment, a portion of the user interface 165 can include a subset of the entire user interface 165. The subset can include one or more objects located at the accessed location 175 of the user interface 165. The controller 120 and/or the interface application can prompt the user through a visual or audio prompt to specify whether to share objects at the accessed location 175 or to share the entire user interface 165.

When sharing the portion of the user interface 165, the controller 120 and/or the interface application can transmit a video stream of the portion of the user interface 165 to the second device. In another embodiment, the controller 120 and/or the interface application can share a file of the objects included in the specified portion of the user interface 165 with the second device. In other embodiments, the controller 120 and/or the interface application can share a name of the object or a link to where the object can be accessed. By sharing a video stream, an object, and/or a link, the device 100 is not exposed to security concerns associated with granting access to the second device through a remote connection.

The second device can use the received information of the portion of the user interface 154 to render a second user interface for a user of the second device to view and/or interact with. As the portion of the user interface 165 is shared, the controller 120 and/or the interface application also transmit information of the accessed location 175 to the second device using the communication component 170. The information of the accessed location 175 can include a coordinate of the user interface 165 accessed by the user. In another embodiment, the information of the accessed location 175 can specify an object, alphanumeric characters, an image, and/or any additional visual content located at the accessed location 175 on the user interface 165.

Using the information of the accessed location 175, the second device can render a visual indicator at a location of the second user interface. For the purposes of this application, a visual indicator is a visual mark or a visual modification which can be rendered at a location of the second user interface based on the information of the accessed location 175 of the user interface 165. The location of the second user interface to render the visual indicator corresponds to the accessed location of the user interface 165. In one embodiment, rendering the visual indicator can include the second device rendering a shape, such as a circle, an X, a square, or a star at a location of the second interface corresponding to the accessed location of the user interface 165. In another embodiment, rendering the visual indicator includes modifying the second user to magnify and/or animate the location of the second interface corresponding to the accessed location of the user interface 165.

Figure 2:
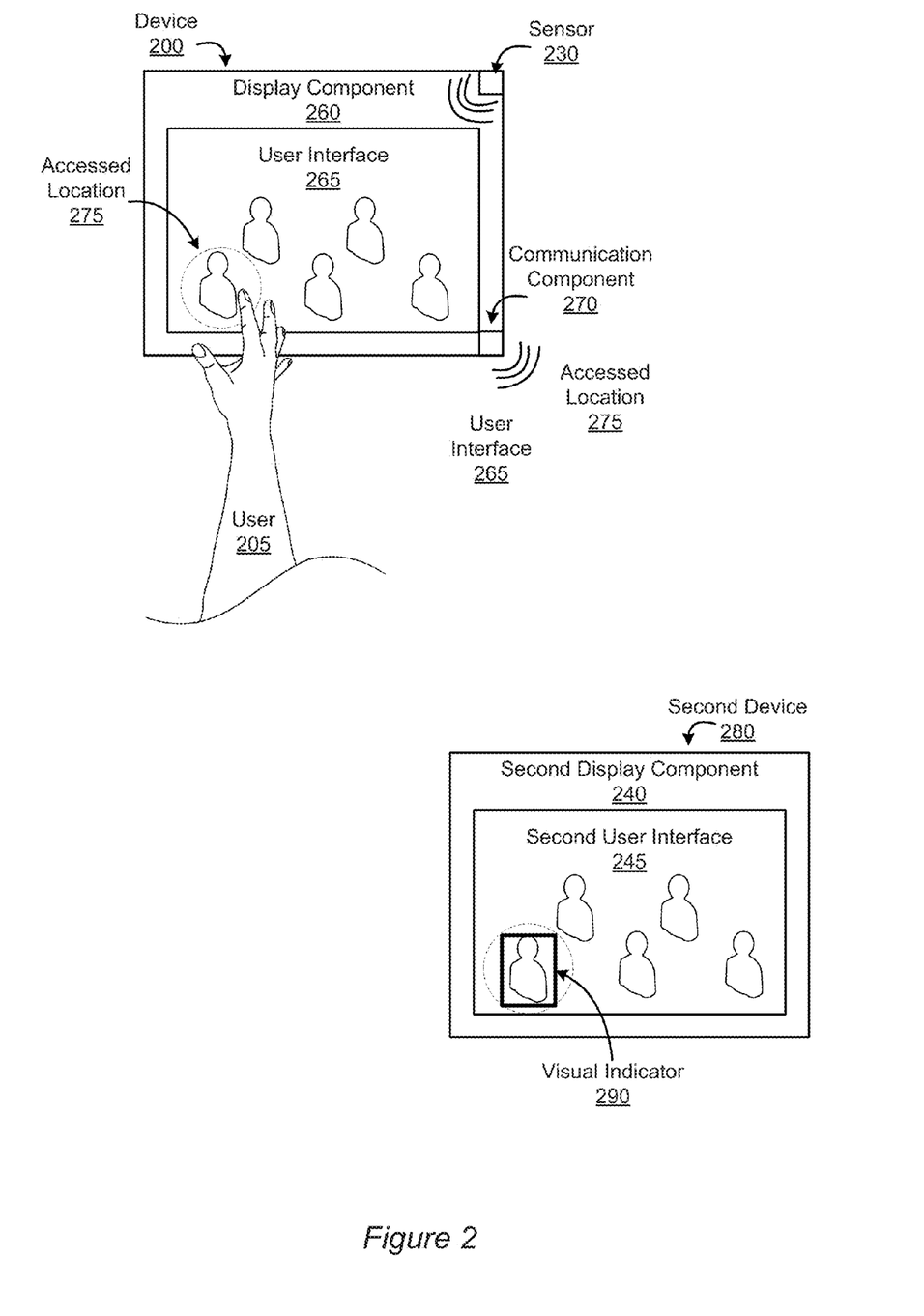
FIG. 2 illustrates a sensor detecting a user accessing a location of a user interface according to an example.

FIG. 2 illustrates a sensor 230 detecting a user 205 accessing a location of a user interface 265 according to an example. As noted above, the user interface 265 can be rendered on a display component 260, such as a LCD, a LED display, a CRT display, a plasma display, a projector and/or any additional device configured to display objects as part of the user interface 265. The objects can include wallpaper, a screen saver, a document, media, a webpage, and/or an application of the device 200 for a user 205 of the device 200 to view and/or interact with. The objects can be locally stored on the device 200 or remotely accessed from another location by the device 200.

The user 205 can interact with the user interface 265 by accessing a location of the user interface 265 with a hand gesture. The hand gesture can be made with a hand, palm, and/or one or more fingers of the user 205. A sensor 230 of the device 200 can detect for a hand, palm, and/or finger of the user 205 touching, hovering above, and/or pointing to a location of the user interface 165. The sensor 230 can be a touch screen, an image capture component, a proximity sensor, radar, and/or any additional component which can detect for the user 205 accessing a location of the user interface 265.

As shown in the present embodiment, the user 205 has accessed an image of a person displayed on a lower left portion of the user interface 265. In response to detecting an accessed a location 275 of the user interface 265, the sensor 230 passes information of the accessed location 275 to the controller and/or interface application of the device 200. As noted above, the information from the sensor 230 can include a coordinate of the user interface 265 corresponding to the accessed location 275. The controller and/or the interface application can use the coordinate as information of the accessed location 275. In another embodiment, the controller and/or the interface application can identify an object of the user interface 265 located at the accessed location 275.

The controller and/or the interface application can then use a communication component 270 of the device 200 to share a portion of the user interface 265 with the second device 280 and to transmit information of the accessed location 275 of the user interface 265 to the second device 280. As noted above, the communication component 270 can be a network interface component, a radio component, a Bluetooth component, and/or an Infrared component to physically or wirelessly couple the device 200 to the second device 280 and transfer information and/or data between the device 200 and the second device 280. The second device 280 can be a computing device which can couple with the device 200 and receive information of a portion of the user interface 265.

When transmitting a portion of the user interface 265, the controller and/or the interface application can initially determine whether to share the entire user interface 265 or one or more objects of the user interface 265 located at the accessed location 275. In one embodiment, a default option for the device 200 includes not sharing the entire user interface 265 and to share objects at the accessed location 275 as the portion of the user interface 265. In other embodiments, the user 205 can be prompted with a visual or audio prompt to select whether to share the entire user interface 265 or to share objects of the user interface 275 at the accessed location 275.

The portion of the user interface 265 can be shared by the controller and/or the interface application as a video stream transmitted to the second device 280. In another embodiment, the controller and/or the interface application can transfer a file of an object at the accessed location when sharing a portion of the user interface 265. In other embodiments, the controller and/or the interface component can transmit a link for the second device 280 to use to access or retrieve the objects located at the accessed location 275. The controller and/or interface application can additionally transmit information of where the object should be rendered on a second user interface 245 of the second device 280. In other embodiments, the controller and/or the interface application can share a resolution of the user interface 265 for the second device 280 to use for the second user interface 245.

The second device can use the information of the portion of the user interface 265 to render a second user interface 245 on a second display component 240 of the second device 200. As shown in the present embodiment, the entire user interface 265 can be shared as the portion of the user interface 265. As a result, the second user interface 245 of the second device 280 matches the user interface 265 of the device 200. Further, the second user interface 245 can be rendered at a same resolution as the user interface 265.

As a portion of the user interface 265 is shared, the controller and/or the interface application can also transmit information of the accessed location 275 to the second device 280. The information of the access location 275 can be transmitted as a data package and/or as a file to the second device 280. As noted above, the information can include a coordinate of the user interface 265 for the accessed location 275. In another embodiment, the information can list an object of the user interface located at the accessed location 275. Using the information of the accessed location 275, the second device 280 renders a visual indicator 290 at a location of the second user interface 245. As noted above, the visual indicator 290 is rendered at the location of the second user interface 245 corresponding to the accessed location 275 of the user interface 265.

In one embodiment, the second device 280 accesses a coordinate listed in the information of the accessed location 275 and renders the visual indicator 290 at the corresponding coordinate on the second user interface 245. In another embodiment, if the information of the access location 275 lists an object of the user interface 265, the second device 280 can search the second user interface 245 for the object and proceed to render the visual indicator 290 at a location of the second user interface 245 where the object is found.

As shown in FIG. 2, a visual indicator 290 can be a visual mark, such as a rectangle, and the visual indicator 290 is rendered at a location of the second user interface 245 corresponding to the accessed location 275 of the user interface 265. In another embodiment, the visual indicator 290 can include other types of visual marks such as a square, a star, an X, and/or a circle. In other embodiments, rendering the visual indicator 290 includes rendering the corresponding location of the second user interface 245 to magnify and/or animate. Additionally, the second device 280 can determine a type of visual indicator 290 to render on the second user interface 245. When determining which type of visual indicator 290 render, the second device 280 can determine whether a type of visual indicator 290 has been specified 290. The type of visual indicator 290 can be specified in the information of the accessed location 275 by the user 205 of the device 200.

The type of visual indicator 290 can specify whether the visual indicator 290 is to a visual mark and/or a modification to the second user interface 245. Additionally, the type of visual indicator 290 can specify whether the visual mark is a square, a star, an X, a circle, and/or any additional visual mark. Further, the type of visual indicator 290 can specify whether the modification is to magnify and/or animate the corresponding location of the second user interface 245. In one embodiment, the user 205 of the device 205 can be prompted by an audio or video prompt to specify the type of visual indicator 290 for the second device 280 to render. In another embodiment, if no type of visual indicator 290 is specified by the user 205, the second device 280 can randomly select a visual indicator 290 to render or a user of the second device 280 can be prompted to select the type of visual indicator 290 which he/she would like to view on the second user interface 245.

Figure 3:
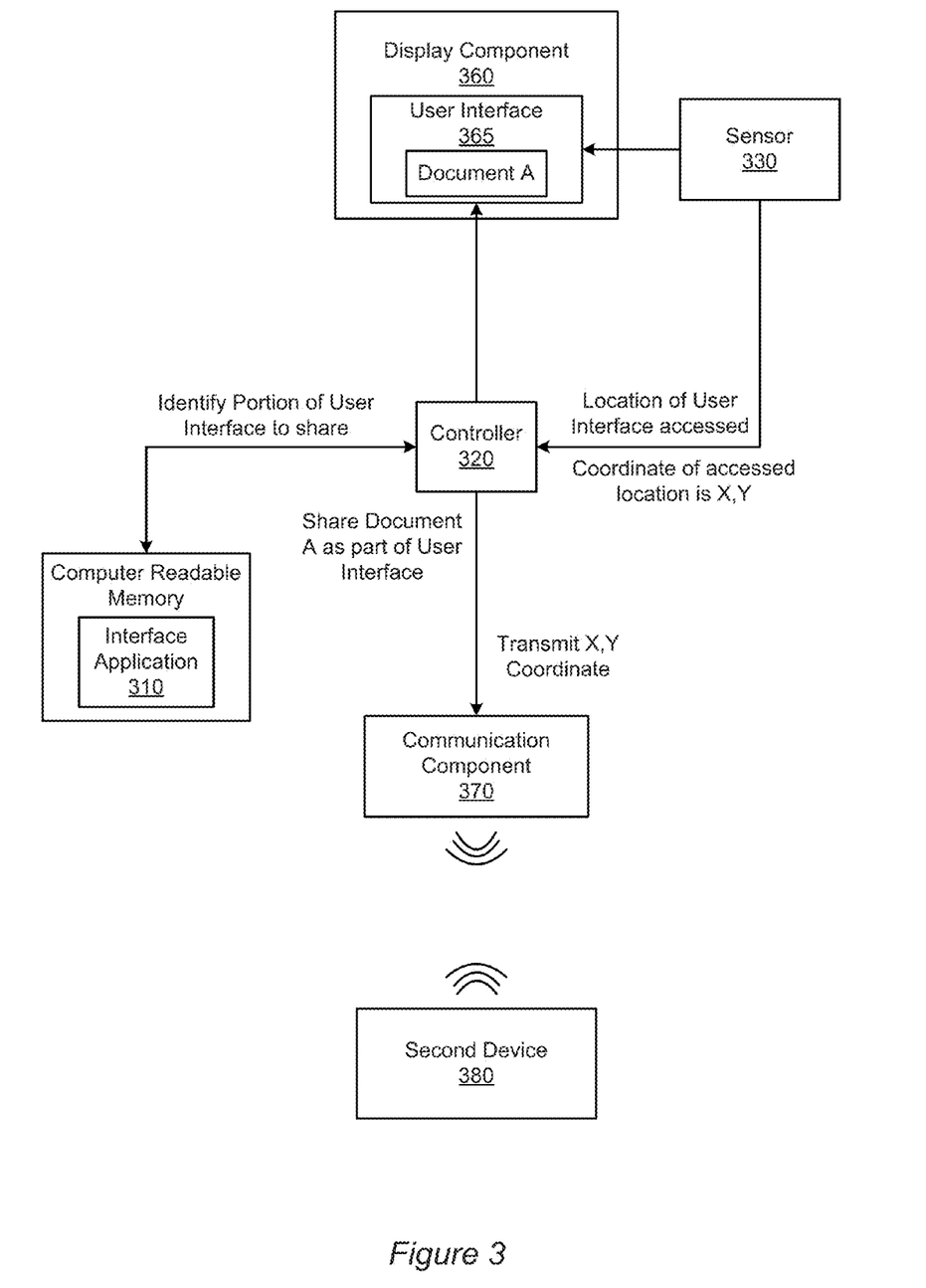
FIG. 3 illustrates a block diagram of an interface application transmitting information to a second device according to an example.

FIG. 3 illustrates a block diagram of an interface application 310 transmitting information to a second device 380 according to an example. As noted above and shown in FIG. 3, the interface application 310 can be a firmware of the device or an application stored on a computer readable memory accessible to the device. The computer readable memory is any tangible apparatus, such as a hard drive, a compact disc, a flash disk, a network drive or any other form of computer readable medium that contains, stores, communicates, or transports the interface application 310 for use by the device.

As shown in the present embodiment, the controller 320 and/or the interface application 310 configure the display component 360 to display a user interface 365 with Document A. As Document A is displayed on the user interface 365, the sensor 33 detects a user accessing a location of the user interface 365. The sensor 330 shares information of the accessed location (coordinate X, Y) with the controller 320 and/or the interface application 310.

In response to detecting an accessed location of the user interface 365, the controller 320 and/or the interface application 310 identify a portion of the user interface 365 to share with the second device 380 and transmit information of the accessed location to the second device. In other embodiments, the controller 320 and/or the interface application 310 can identify a portion of the user interface 365 to share before the sensor 330 has detected an accessed location of the user interface 365. The controller 320 and/or the interface application 310 can prompt the user to specify the portion of the user interface 365 to share with the second device. In other embodiments, a portion of the user interface 365 can be defined to be an object included at the accessed location of the user interface 365. As noted above, the portion can include the entire user interface 365 or one or more objects displayed on the user interface 365.

As shown in FIG. 3, Document A has been selected as the portion of the user interface 365 to share with the second device. The controller 320 and/or the interface application 310 use the communication component 370 to transmit Document A as a file to the second device 380. In another embodiment, the controller 320 and/or the interface application 310 can transmit a link, such as a web address, of where Document A can be accessed by the second device 380. As Document A is shared, the controller 320 and/or the interface application 310 additionally transmit information of the accessed location of the user interface 365 to the second device 380. As shown in the present embodiment, the controller 320 and/or the interface application 310 transmit the coordinates X, Y, as the information of the accessed location to the second device 380. In other embodiments, the controller 320 and/or the interface application 310 additionally transmit a resolution which is currently used for the user interface 365. The resolution can be used by the second 380 device as a resolution for the second user interface. As a result, the shared portion of the user interface 365 and the accessed location of the user interface 365 appear on the second user interface of the second device 380 to match the user interface 365.

Figure 4:
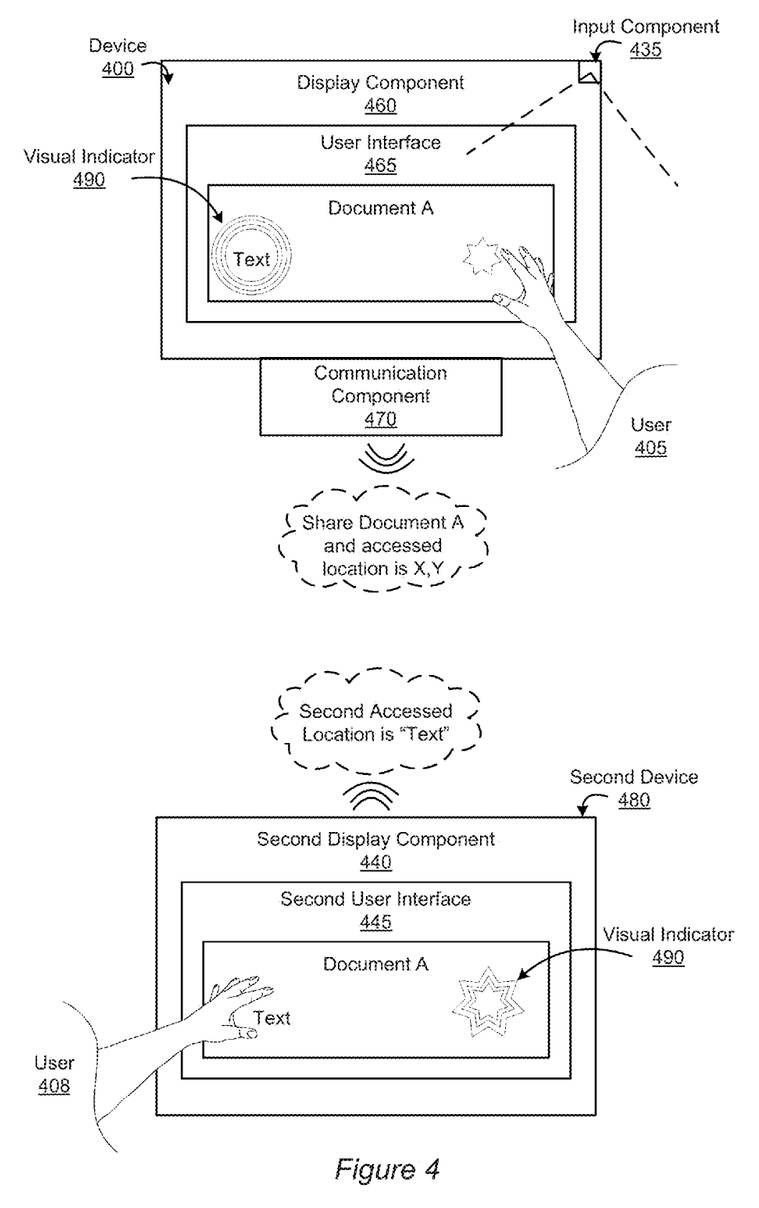
FIG. 4 illustrates a device and a second device sharing accessed information according to an example.

FIG. 4 illustrates a device 400 and a second device 480 sharing accessed information according to an example. As shown in FIG. 4, an object, Document A is rendered for display on the user interface 465 of the device 400. Additionally, user 405 has been detected accessing an image of a star at a far right location of Document A. The coordinate of the star on the user interface 465 is identified by the controller and/or the interface application to be X, Y. In response, the communication component 470 shares a portion of the user interface 465 and information of the accessed location is transmitted to the second device 480. As shown in FIG. 4, the communication component 470 shares Document A as a portion of the user interface 465 and the communication component transmits coordinate X, Y as information of the accessed location to the second device 480.

In one embodiment, the user 405 of the device 400 can additionally create a message associated with the accessed location. For the purposes of this application, the message can include information associated with the accessed location which the user 405 can use to communicate to user 408 of the second device 480. In one embodiment, the message can be a text message which describes what is located at the accessed location. In another embodiment, the message can be an audio or video message which the user can use to notify the other user 408 that an item at the accessed location is incorrect or needs to be modified. In other embodiments, the message can include any additional contextual information from the user 405 associated with the accessed location of the user interface 465.

The device 400 can include an input component 435 to capture the message associated with the accessed location. The input component 435 is a hardware component, such as an image capture component, a microphone, and/or a keyboard which the user 405 can use to create an alphanumeric message, a video message, and/or an audio message. In one embodiment, the user interface 465 can display a message asking whether the user would like to create a message. In another embodiment, the input component 435 can automatically enable to capture a message associated with the accessed location in response to the user 405 accessing a location of the user interface 465. The message can be transmitted with the information of the accessed location to the second device 480 with the communication component 470.

As shown in FIG. 4, the second device 485 receives Document A and proceeds to render a second user interface 445 on a second display component 440 to include Document A. Additionally, the second device 480 receives the coordinate X, Y and proceeds to render a visual indicator 490 at coordinate X, Y of the second user interface 445. The second device 480 renders the visual indicator 490 by modifying the second user interface 445 to magnify the coordinate X, Y. As a result, the image of the star which was accessed by the user 405 of the device 400 is magnified on the second user interface 445. In one embodiment, if the second device 480 also receives a message from the device 400, the second device 480 can output the message on the second user interface 445 or with an audio speaker of the second device 480. As a result, the user 405 of the device 400 can communicate contextual information of the accessed location with the user 408 of the second device 480 with the message.

As shown in FIG. 4, a user 408 of the second device 480 can also access a location of the second user interface 445. The user 408 of the second device 480 accesses the alphanumeric characters "Text" located at a far left side of Document A. In response, the second device 480 transmits information of the accessed location of the second user interface 445 over to the device 400. The information of the accessed location is transmitted by the second device 480 as a string "Text" In another embodiment, user 408 can additionally record a message associated with "Text" to transmit to the device 400.

In response to receiving the information of the accessed location, the controller and/or the interface application can proceed to search Document A for the string "Text." The controller and/or the interface application identify the string "Text" is located at a far left side of Document A and proceed to render a visual indicator 490 around "Text" As shown in the present embodiment, the visual indicator 490 can include one or more shapes, such as a circle, rendered at the location of the user interface 465 corresponding to the accessed location. In another embodiment, the message can be outputted on the device 400 for the user 405 along with the visual indicator 490.

Figure 5:
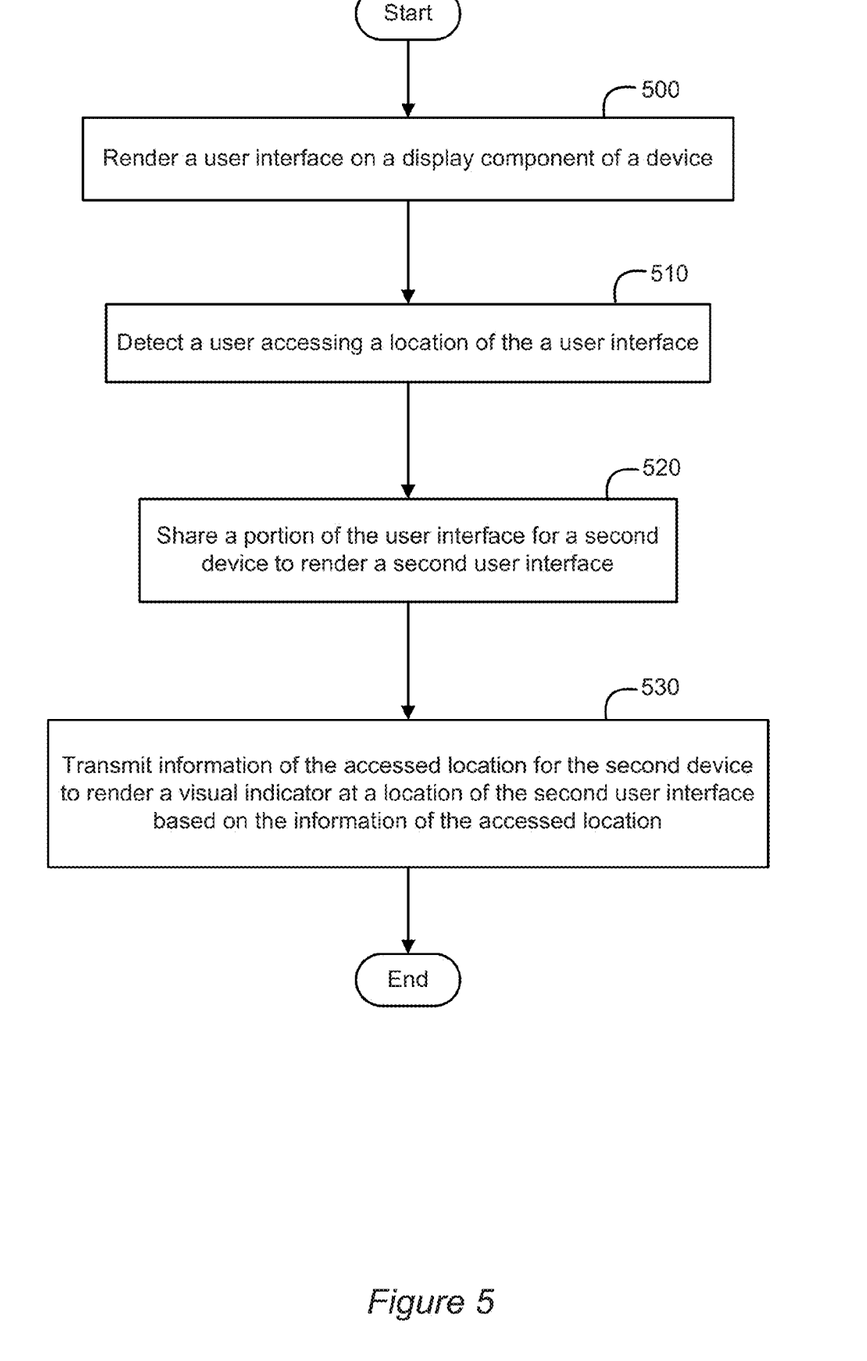
FIG. 5 is a flow chart illustrating a method for managing a device according to an example.

FIG. 5 is a flow chart illustrating a method for managing a device according to an example. A controller and/or interface application can be utilized independently and/or in conjunction with one another to manage the device. The controller and/or the interface application initially render a user interface on a display component of the device at 500. The user interface includes objects, such as a document, wallpaper, a screen saver, media, and/or an application which can include alphanumeric characters, images, and/or videos for a user of the device to view and/or interact with.

A sensor of the device can detect for a hand gesture from the user when detecting the user accessing a location of the user interface at 510. In response to detecting an accessed location of the user interface, the controller and/or the interface application can share a portion of the user interface for a second device to render a second user interface at 520. In one embodiment, a portion of the user interface can include everything included on the user interface. In another embodiment, a portion of the user interface includes an object located at the accessed location of the user interface.

The controller and/or the interface application can share the portion of the user interface using a communication component. The portion of the user interface can be shared as a video stream, a file including the object, and/or a link to the object. The controller and/or the interface application can also use the communication component to transmit information of the accessed location to the second device for the second device to render a visual indicator at a location of the second user interface based on the information of the accessed location at 530. As noted above, the location of the second user interface of the second device corresponds to the accessed location of the user interface of the device. The visual indicator can be rendered at the location of the second user interface as a visual mark. In another embodiment, rendering the visual indicator includes magnifying or animating the location of the second user interface. The method is then complete. In other embodiments, the method of FIG. 5 includes additional steps in addition to and/or in lieu of those depicted in FIG. 5.

Figure 6:
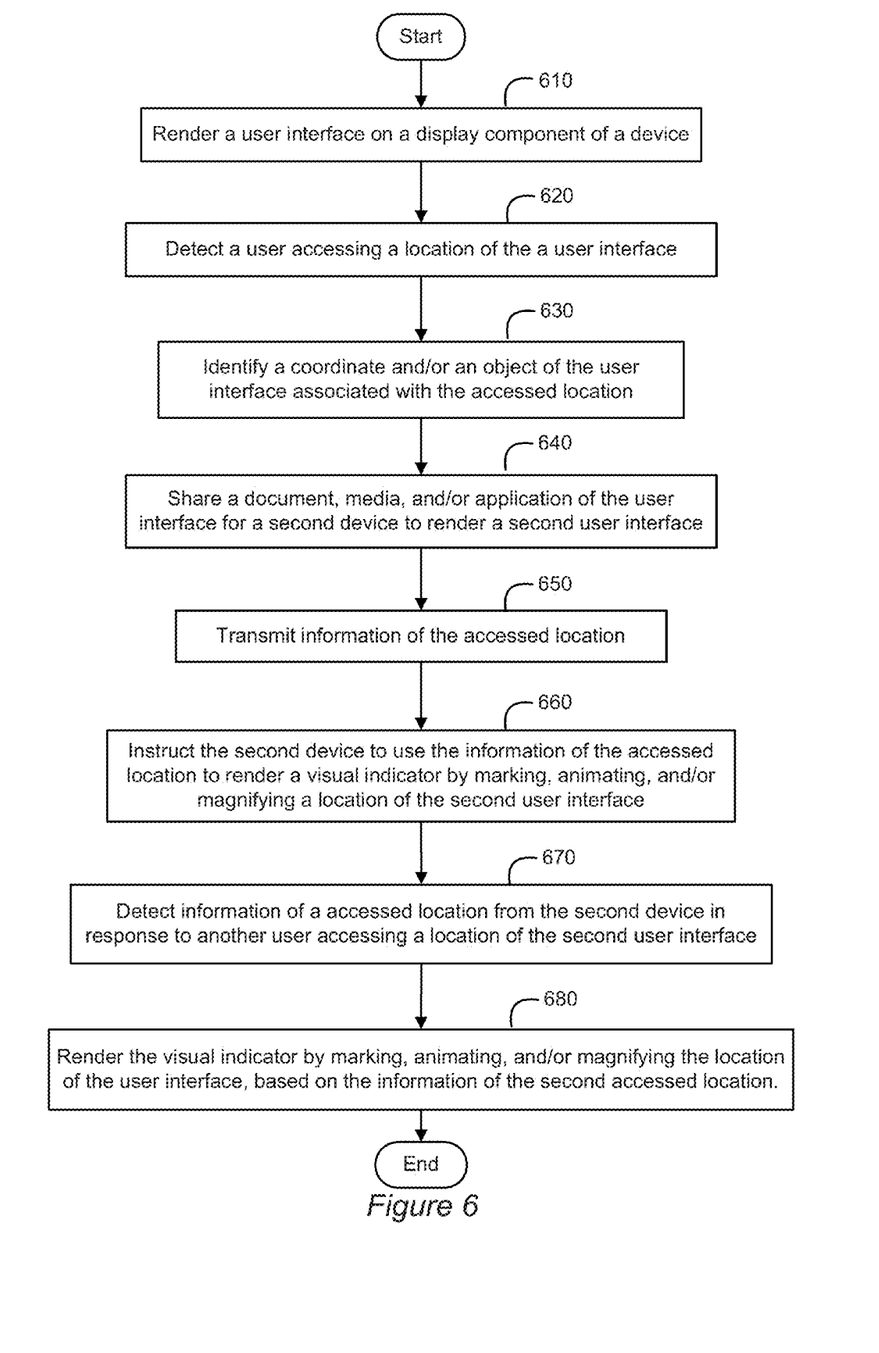
FIG. 6 is a flow chart illustrating a method for managing a device according to another example.

FIG. 6 is a flow chart illustrating a method for managing a portable device according to an example. The controller and/or the interface application initially render a user interface to include one or more objects on a display component at 610. A sensor, such as an image capture component, a touch screen, a proximity sensor, and/or a radar can detect for a finger, a palm, and/or a hand of the user touching, coming within proximity, or hovering above a location of the user interface to detect for the user accessing a location of the user interface at 620. If the user accesses a location of the user interface, the controller and/or the interface application can identify information of the accessed location by receiving a coordinate from the sensor at 630. In one embodiment, the controller and/or the interface application additionally identify an object, alphanumeric characters, an image, and/or a video displayed at the accessed location of the user interface.

As information of the accessed location is identified, the controller and/or the interface application can use a communication component to share a portion of the user interface for a second device to render a second user interface at 640. As noted above, the shared portion of the user interface can include everything displayed on the user interface. In another embodiment, the shared portion of the user interface includes an object, such as a document, media, an application, wallpaper, and/or a screensaver which is rendered on the user interface. The portion of the user interface can be shared as a video stream, as a file with the object, and/or with a link used by the second device to access the object. Using the received portion of the user interface from the device, the second device can render a second user interface.

The controller and/or the interface application can also use the communication component to transmit information of the accessed location to the second device at 650. In one embodiment, the information of the accessed location includes a coordinate of the accessed location. In another embodiment, the information of the accessed location lists an object, alphanumeric characters, an image, and/or a video located at the accessed location of the user interface. In other embodiments, the information can include a resolution of the user interface and/or a message associated with the accessed location.

The controller and/or the interface application can also send an instruction for the second device to render a visual indicator at a location of the second user interface using the information of the accessed location at 660. As noted above, the location to render the visual indicator on the second user interface corresponds to the accessed location of the user interface. The visual indicator can be rendered as a visual mark on the second user interface. In another embodiment, rendering the visual indicator includes modifying the corresponding location of the second user interface to magnify and/or animate.

Additionally, as the visual indicator is rendered on the second user interface, the communication component of the device can detect for information of an accessed location from the second device in response to a user of the second device accessing a location of the second user interface at 670. The controller and/or the interface application can then render a visual indicator at a location of the user interface corresponding to the accessed location of the second user interface at 680. The method is then complete. In other embodiments, the method of FIG. 6 includes additional steps in addition to and/or in lieu of those depicted in FIG. 6.

What is claimed is:

1. A device comprising:
   a display;
   a communication component;
   a controller in communication with the display and the communication component, the controller configured to:
   establish a connection to a second device;
   cause the display to display a user interface;
   determine a shared portion of the user interface to share with the second device,
   in response to determining the shared portion of the user interface, determine an object within the shared portion of the user interface, wherein the object comprises a file or an application and wherein the controller is further configured to transmit a copy of the file or the application to the second device to transmit the shared portion of the user interface and the object to the second device,
   enable the second device to render a second user interface comprising the shared portion of the user interface and the object by causing the communication component to transmit the shared portion of the user interface and the object to the second device, and
   cause the communication component to transmit information to the second device to enable access to contents of the object at the second device.

2. The device of claim 1 wherein the shared portion of the user interface includes at least one of a document, a media, and an application rendered on the user interface.

3. The device of claim 1, further comprising a sensor, and wherein the controller is further configured to determine an accessed location based on information received from the sensor and to cause the network component to transmit the accessed location to the second device, wherein the information includes a coordinate of the user interface, and wherein the second device is configured to use the coordinate as a location in the second user interface.

4. The device of claim 3 wherein the controller is further configured to transmit a type of visual indicator, the second device configured to render the visual indicator on the second user interface.

5. The device of claim 4 wherein the second device is configured to render the visual indicator by modifying the second user interface to include a visual mark at the location of the second user interface.

6. The device of claim 4 wherein the second device is configured to render the visual indicator by magnifying or animating the location of the second user interface based on the information of the accessed location.

7. The device of claim 3 wherein the sensor includes at least one of a touch screen, an image capture component of the device, a radar, and a proximity sensor.

8. The device of claim 3 wherein the communication component includes at least one of a network interface component, a radio component, an Infrared component, and a Bluetooth component.

9. A method for managing a device comprising:
   establishing a connection to a second device;
   rendering a user interface on a display;
   determining a shared portion of the user interface to share with the second device;
   in response to determining the shared portion of the user interface, determining an object within the shared portion of the user interface, wherein the object comprises a file or an application and wherein the controller is further configured to transmit a copy of the file or the application to the second device to transmit the shared portion of the user interface and the object to the second device;
   transmitting the shared portion of the user interface and the object to a second device to render a second user interface comprising the shared portion of the user interface and the object; and
   transmitting information to the second device to enable access to contents of the object at the second device.

10. The method for managing the device of claim 9 further comprising:
- determining an accessed location of the shared portion of the user interface;
- capturing a message associated with the accessed location; and
- transmitting the message to the second device.

11. The method for managing the device of claim 10 wherein the accessed location includes the message from the user.

12. The method for managing the device of claim 10 further comprising receiving information of a second accessed location from the second device.

13. The method for managing the device of claim 12 further comprising rendering a second visual indicator at a location of the user interface based on the second accessed location from the second device.

14. The method for managing the device of claim 13 wherein rendering the second visual indicator includes rendering at least one of a visual mark at the location of the user interface, animating the location of the user interface, or magnifying the location of the user interface based on the second accessed location.

15. The method for managing the device of claim 10 wherein the accessed location includes the coordinate of the accessed location of the user interface.

16. The method for managing the device of claim 15 wherein the accessed location includes the object rendered at the coordinate of the user interface.

17. The method for managing the device of claim 10 wherein the accessed location includes a resolution of the user interface.

18. A non-transitory computer readable medium comprising program code that if executed cause a controller to execute a software application, the software application configured to:
- establish a connection to a second device;
- render a user interface on a display;
- determine a shared portion of the user interface to share with the second device
- in response to determining the shared portion of the user interface, determine an object within shared portion of the user interface, wherein the object comprises a file or an application and wherein the controller is further configured to transmit a copy of the file or the application to the second device to transmit the shared portion of the user interface and the object to the second device;
- transmit the shared portion the user interface and the object to the second device and enable the second device to display a second user interface comprising the shared portion of the user interface and the object, and
- transmit information to the second device to enable access to contents of the object at the second device.

19. The non-transitory computer readable medium of claim 18, wherein the software application is further configured to transmit a video stream of the user interface to the second device to use as the second user interface.

* * * * *